(12) United States Patent
Roberts

(10) Patent No.: X9366
(45) Date of Patent: Feb. 5, 1836

(54) CHURN

(76) Inventor: Hezekiah Roberts

Hezekiah Roberts
Letters Patent

The schedule referred to in these Letters Patent and making part
of the same containing a description in the words of the said Hezekiah
Roberts himself of his improvement in the Churn

---

To all to whom these presents shall come. Be it known that I Heze-
kiah Roberts of Seneca Falls in the County of Seneca and State of New
York have invented a new and useful improvement in the construc-
tion of churns for making butter and that the following is a full and
exact description thereof. Take a square box of such dimensions as suits
the maker in this fix an upright moveable shaft with two wings not
solid but open or of wicker work. set the churn firm in a square frame
with two posts rising above the churn and having a piece framed
across the top into which the top of the upright shaft is inserted.
into one of the posts frame a round moveable piece of plank with a
lever attached, around this round plank attach strong pieces of leather
which wind around the upright or dasher one being to the right & the
other to the left and attach them thereto. so that by raising the lever
the said shaft will be turned one way and by depressing the same
said shaft will be turned the other way, to the end of the lever at-
tach another moveable joint; a rod of metal or timber attached at
the other end to a crank on the shaft of which this crank is a part is
attached an iron pinion into which a spur wheel meshes which
spur wheel is moved by hand on the shaft to which this pinion is at-
tached is a balance wheel of sufficient weight to equalize the mo-
tion. these wheels are fixed in a frame work connected with the square
frame above mentioned. All which are described in the drawing
herewith delivered. Churns like the above have long been in use
in which the breaks or lever was moved by hand. What I claim
as my own invention & not previously known is the crank, connect- Exd
ing rod spur wheel pinion & balance wheel. WJ[illegible]

Witnesses { Luther A. Stevens
Ralph Sumner }

[illegible]

Hezekiah Roberts